United States Patent
Yamashiro et al.

(10) Patent No.: US 8,673,456 B2
(45) Date of Patent: Mar. 18, 2014

(54) COMPOSITE PLATED FILM AND LAMINATED FILM

(75) Inventors: Hirotaka Yamashiro, Osaka (JP);
Yasuhisa Maeda, Toyohashi (JP);
Shuichi Saitoh, Utsunomiya (JP);
Katsuhisa Kashiwazaki, Utsunomiya (JP)

(73) Assignees: Meisei Industrial Company Limited, Osaka (JP); Koyo Engineering Co., Ltd., Utsunomiya (JP)

( * ) Notice: Subject to any disclaimer, the term of this patent is extended or adjusted under 35 U.S.C. 154(b) by 1029 days.

(21) Appl. No.: 11/598,703

(22) Filed: Nov. 14, 2006

(65) Prior Publication Data

US 2007/0237957 A1     Oct. 11, 2007

(30) Foreign Application Priority Data

Nov. 15, 2005 (JP) .................................. 2005-329840

(51) Int. Cl.
 *B32B 15/04* (2006.01)
 *B32B 15/08* (2006.01)
(52) U.S. Cl.
 USPC ............ 428/626; 428/632; 428/633; 428/658
(58) Field of Classification Search
 USPC ......... 428/626, 632, 666, 649, 650, 651, 652, 428/653, 657, 658, 545, 659, 681, 684, 685, 428/633
 See application file for complete search history.

(56) References Cited

U.S. PATENT DOCUMENTS

| | | | |
|---|---|---|---|
| 5,536,448 A | 7/1996 | Takahashi et al. | |
| 2002/0047134 A1 | 4/2002 | Fujishima et al. | |
| 2003/0096102 A1 | 5/2003 | Yoshihara et al. | |
| 2004/0014870 A1 * | 1/2004 | Tominaga et al. | 524/501 |
| 2004/0115362 A1 * | 6/2004 | Hartig et al. | 427/446 |

FOREIGN PATENT DOCUMENTS

| | | |
|---|---|---|
| EP | 0 573 015 | * 12/1993 |
| JP | A-6-316790 | 11/1994 |
| JP | A-7-26400 | 1/1995 |
| JP | A 07-133442 | 5/1995 |
| JP | A-7-138021 | 5/1995 |
| JP | A-09-263718 | 10/1997 |
| JP | A-10-158860 | 6/1998 |
| JP | A 11-276891 | 10/1999 |
| JP | A 2000-061193 | 2/2000 |
| JP | A 2000-084415 | 3/2000 |
| JP | A 2000-178783 | 6/2000 |

(Continued)

OTHER PUBLICATIONS

Machine Translation, Toshima, JP 2004-057846, Feb. 2004.*

(Continued)

*Primary Examiner* — Michael La Villa
(74) *Attorney, Agent, or Firm* — Oliff PLC

(57) ABSTRACT

It is provided a steel with composite plating film providing rust prevention over a long time period and a method of manufacturing thereof. A composite plating film 24 is formed on a metal material 21. The film 24 has a plating film 23 made of a sacrificial anode metal and photocatalyst particles 22 dispersed and fixed in the plating film 23. The photocatalyst particle has a main body composed of a photocatalyst and a semiconductor material supported thereon. The composite plating film 24 is formed on the surface of the metal material 21 by electroplating, hot-dipping, chemical plating or the like.

10 Claims, 8 Drawing Sheets

(56) References Cited

FOREIGN PATENT DOCUMENTS

| | | | |
|---|---|---|---|
| JP | A 2000-282260 | | 10/2000 |
| JP | A 2000-317388 | | 11/2000 |
| JP | A-2001-226757 | | 8/2001 |
| JP | A 2001-247985 | | 9/2001 |
| JP | A 2001-262379 | | 9/2001 |
| JP | A-2001-335913 | | 12/2001 |
| JP | A 2002-060676 | | 2/2002 |
| JP | A 2002-069677 | | 3/2002 |
| JP | A 2002-254556 | | 9/2002 |
| JP | A 2002-273238 | | 9/2002 |
| JP | A 2002-275430 | | 9/2002 |
| JP | A 2002-277609 | | 9/2002 |
| JP | A-2003-96581 | | 4/2003 |
| JP | A-2003-231973 | | 8/2003 |
| JP | 2004-057846 | * | 2/2004 |
| JP | A 2005-058900 | | 3/2005 |
| JP | A 2005-139532 | | 6/2005 |
| JP | A 2005-168784 | | 6/2005 |
| JP | A 2006-143815 | | 6/2006 |
| WO | WO 99/39839 A1 | | 8/1999 |

OTHER PUBLICATIONS

Saito, Shuichi et al. "Cathoidic photo-protection of the steel material by using photocatalyst in state of dark and ultraviolet irradiation," Photocatalysis, Photo Functionalized Material Society, vol. 18, P-80, p. 192-193 (Dec. 6, 2005). -Translation-.

Saito, Shuichi et al. "Cathoidic photo-protection of the steels by using the photocatalyst," Photocatalysis, Photo Functionalized Material Society, vol. 15, P-76, p. 186-187 (Dec. 14, 2004). -Translation-.

Suzuki, Yosuke et al. "Proceedings of 36'th Annual Meeting of Union of Chemistry-Related Societies in Chubu Area, Japan," New Attempt for Corrosion Protection of Iron, 2J02, p. 191 (Sep. 23, 2005). -Translation-.

Japanese Office Action issued in JP-A-2006-307575 on Aug. 28, 2009, with English language Translation.

* cited by examiner (a)

(b)

(c)

(a)

(b)

COMPOSITE PLATED FILM AND LAMINATED FILM

BACKGROUND OF THE INVENTION

1. Field of the Invention

The invention relates to a steel with composite plating film having a metal plated layer containing photocatalyst particles with a semiconductor material formed on the surface, and a manufacturing method thereof. Further, the present invention relates to corrosion resistant film for a metal used in the dark with not illuminated, a method of preventing corrosion of metal in the dark and a composite film.

2. Related Art Statement

Although steel materials are widely used for structures, it is susceptible to rust when subjected to severe corrosive conditions. It is thus needed to perform corrosion resistant treatment. Plating is representative as the corrosion resistant treatment, and zinc plating has been most widely used.

The mechanism of the method of electrochemical corrosion prevention of the zinc plating will be described. The ionization tendency of fixed zinc is larger than that of steel. In the case that galvanized steel and electrolyte contact each other, zinc is dissolved earlier and electrons are injected into the steel. The immersion potential of a steel is rapidly shifted to "less noble potential" to realize the cathodic protection of the steel. The immersion potential of a steel under the effect of sacrificial corrosion prevention represented with respect to a saturated silver chloride electrode corresponds with a value of minus 730 mV or lower (vs. Ag/AgCl). Zinc plating is described in, for example, "Corrosion Science and Engineering".

It has disclosed photo-electrochemical cathodic protection utilizing titanium oxide as a photocatalyst (Japanese patent publication Nos. 2001-247985A, 2001-262379A, 2002-69677A and 2002-273238A).

Further, it is disclosed to provide a metal plating layer containing photocatalyst particles in Japanese Patent publication Nos. 2000-84415A and 2005-58900A.

Further, the provision of a photocatalyst layer on a plated layer is described in the following documents.

Japanese patent publication No. 2000-61193A
Japanese patent publication No. 2005-168784A
Japanese patent publication No. H11-276891A
Japanese patent publication No. 2002-254556A
Japanese patent publication No. 2000-282260A
Japanese patent publication No. 2000-178783A
Japanese patent publication No. 2005-139532A Further, the inventors have disclosed a corrosion prevention paint for metal, containing a sacrificial anode metal and an photocatalyst in Japanese patent publication No. 2006-143815A.

Although a metal, particularly carbon steel, is an excellent material for a structure, it had a defect of deterioration due to rust. The method of corrosion prevention of carbon steel is mainly categorized into two kinds of methods; physical and electrochemical corrosion prevention. A physical corrosion prevention is a method of covering the surface of a steel with a chemically inert film to prevent oxygen and water of the environment inducing the corrosion. Representatives are chrome plating, phosphating, chemical passivation treatment and anti-corrosion steel. Further, although it is not a chemical treatment, a protective coating is obtained by covering the surface of a steel with an organic paint such as epoxy, polyurethane resin or the like and has the effect of preventing water or chloride ions. It is one of a measure of preventing corrosion of a steel by an organic paint.

However, according to these physical corrosion prevention methods, damages or peeling may be generated in the corrosion prevention films due to various reasons. And water or oxygen penetrates into the metal surface through defects and cracks. Severe corrosion starts from there.

On the other hand, the method of electrochemical corrosion prevention is covering the surface of a steel with a metal plating so that the plated metal functions as an anode to prevent corrosion of the underlying steel electrochemically. This is so-called cathodic protection. Representatives are tinning, zinc plating or the like carried out in factories. Further, zinc dust anticorrosive paint (zinc-rich paint) coating containing zinc metal particles, the representative of cathode corrosion prevention, is used widespread on sites. Zinc-rich paint is described in, for example, Japanese patent publication No. H07-133442A.

SUMMARY OF THE INVENTION

However, according to the electrochemical corrosion prevention, although the corrosion of a steel is prevented, zinc is lost by sacrifice elution and the amount of zinc is decreased, so that the effect of corrosion prevention is gradually lost. Particularly, under the circumstances where many chloride ions are present such as seacoast, the elution of zinc is proceeded due to flying particles of sea salt or the like, so that a long-term effect of corrosion prevention cannot be obtained and thus problematic.

The above described defects of the corrosion prevention methods are solved by painting periodically or replacing the corroded members. However, a problem of a huge cost arises for the maintenance of facilities in metal structures such as steel tower, bridge or the like, ships, railways or piping of a chemical plant.

Further, according to the electrochemical corrosion prevention, the elution and corrosion of the underlying steel due to the peeling of the coating by damages can be prevented, unlike the case of the physical corrosion prevention. Zinc is, however, susceptible to sacrifice elution. As the amount of zinc is thereby decreased, the effect of corrosion prevention is gradually lost. Particularly, under the circumstances rich in chloride ions such as seacoast, the life of corrosion prevention is considerably shortened.

Thus, the inventors have thus disclosed a corrosion prevention paint for metal containing a sacrificial anode metal and photocatalyst, in Japanese patent publication No. 2006-143815A.

Further, in the electrochemical corrosion prevention method for in-door machines and facilities hardly illuminated and for the surface of underground structures, the corrosion prevention effect is also rapidly lost due to the sacrifice elution of zinc, and a solution has been demanded.

An object of the invention according to a first aspect is to prevent the elution of a sacrificial anode metal over time and to lengthen the life of a corrosion prevention film using a plating layer of the metal.

The present invention according to a first aspect provides a composite plating film comprising a plating film comprising a sacrificial anode metal and formed on a metal material and photocatalyst particles are dispersed and are fixed in the plating film, wherein the photocatalyst particles comprise particulate main bodies comprising a photocatalyst and a semiconductor material supported with the particulate main bodies.

The present invention further provides a laminated film comprising the composite plating film and a chromate film is formed on the composite plating film.

The present invention further provides a laminated film comprising the composite plating film and a corrosion prevention resin coating is formed on the composite plating film.

The present invention further provides a laminated film comprising the composite plating film, a chromate film and a corrosion prevention resin coating is formed on the composite plating film.

The present invention further provides a method of preventing the corrosion of a metal material by forming the composite plating film on the metal material.

According to the present invention, photocatalyst particles supporting a semiconductor material are contained in a plating film of a sacrificial anode metal. It can be obtained the effect of absorbing electrons from the sacrificial anode metal by the semiconductor material and introduced them to the photocatalyst to retard the depletion of the sacrificial anode metal, under the night or the conditions that the quantity of solar radiation per day is 0.5 MJ/m$^2$ or lower as the average over a year (the north side of a building, the inner side or underside of a structure). Further, when ultraviolet light in the sunshine is received, electrons excited in the photocatalyst is directly injected into the metal material, or injected into the metal material through the semiconductor material to prevent the depletion of the sacrificial anode metal. Thus it is possible to further retard the depletion of the sacrificial anode metal, to obtain the desired rust prevention effect over a long period of time even under the presence of, for example, salt, and to prevent the corrosion of a steel.

Further, an object of a second aspect of the present invention is to provide a corrosion prevention film so that the reduction of the corrosion prevention effect due to sacrifice elution of a sacrificial anode metal can be prevented to obtain the sacrificial anticorrosive effect over a long period of time.

A second aspect of the present invention provides a corrosion prevention film for use in the dark, the film is formed from raw materials comprising a sacrificial anode metal and fine particles of a semiconductor oxide.

The present invention further provides a method of preventing corrosion of a metal material in the dark, and the method comprising the steps of forming the corrosion prevention film on a metal material; and using the metal material in the dark.

The present invention further provides a composite film comprising the corrosion prevention film and a surface film formed on the corrosion prevention film.

The present invention further provides a method of manufacturing a corrosion prevention film for a metal material used in the dark, the method comprising the step of: applying raw materials comprising a sacrificial anode metal and fine particles of a semiconductor oxide on a metal material to from a corrosion prevention film.

According to the present invention, the sacrificial anode metal and fine particles of a semiconductor oxide are contained in the film on the metal material. It is thus possible to obtain the desired rust prevention effect over a long period of time and to prevent the corrosion of a steel in the dark, compared with the case of using the sacrificial anode metal alone. Many of the fine particles of a semiconductive oxide have a function of photocatalyst under the illumination of light. The present invention is, however, based on the discovery of the surprising effects that the fine particles of a semiconductive oxide can retard the sacrifice elution of the sacrificial anode metal from the film and can considerably lengthen the life of the corrosion prevention in the dark conditions with no light. The mechanism of the effects has not been clearly understood yet, and the present invention is therefore pioneer invention.

BRIEF EXPLANATION OF THE ATTACHED DRAWINGS

FIG. 1 schematically shows a composite plating film 24 formed on a metal material 21.

FIG. 2 is a schematic view showing the shape of a preferred fine particle of a semiconductive oxide.

FIG. 3 (*a*) is a diagram schematically showing a laminated film 29 of a composite plating film 24 and a chromate film 27 formed on a metal material 21.

FIG. 3 (*b*) is a diagram schematically showing a laminated film 30 of a composite plating film 24 and a corrosion prevention coating 28 formed on a metal material 21.

FIG. 3 (*c*) is a diagram schematically showing a laminated film 31 of a composite plating film 24, a chromate film 27 and a corrosion prevention film 28 formed on a metal material 21.

FIG. 4 (*a*) is a diagram schematically showing a corrosion prevention film 2 and an upper film 3 formed on a metal material 1.

FIG. 4 (*b*) is a diagram schematically showing a corrosion prevention film 2, an upper film 3 and a surface film 13 formed on a metal material 1.

BEST MODES FOR CARRYING OUT THE INVENTION

The first aspect of the invention will be described.

Figure 1:
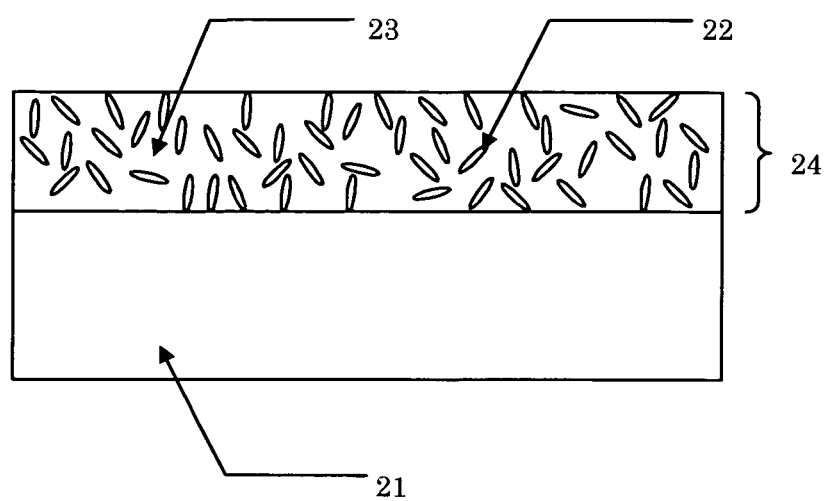

FIG. 1 is a diagram schematically showing a composite plating layer 24, according to one embodiment of the invention, formed on a metal material 21. The composite plating layer 24 is composed of a plating layer 23 made of a sacrificial anode metal and composite photocatalyst particles 22 dispersed and fixed in the plating layer.

Any kinds of the metal materials can be used as far as it is used as a plating steel such as a cold-rolled steel plates or hot-rolled steel plates, and the composition is not particularly limited.

Any shapes of metal materials can be used such as thin plate, thick plate, rod, wire or the like as far as it is used for a plating steel, and the shape is not particularly limited.

The metal material is not limited, and it is particularly useful for the following metals.

Pure iron, electrolytic iron, carbon steel, limmed steel, killed steel, semi-killed steel, alloy steel, superalloy, capped steel, anti-corrosion steel, hot-dip aluminium coated steel, chromium-plated steel, hot-dip galvanized coated steel, electrolytic zinc-coated steel, aluminum-zinc alloy coated steel, lead-tin alloy coated steel (terne coated steel), tinplate steel, silicon steel, chromium plated tin free steel.

The metal material is subjected to pretreatment for plating to remove oils and fats and rust on the surface. The method of the pretreatment for plating includes alkali cleaning, pickling, electrolytic cleaning, washing with water, washing with hot water, flux treatment or the like, according to normal procedures of the pretreatment for plating.

Although the kind of the sacrificial anode metal is not particularly limited, it may be listed one metal or the alloy of Zn/zinc, Mg/magnesium and Al/aluminum; Mg/Al/Zn alloy, Al—Zn alloy doped with a small amount of In/indium or Sn/tin; Zn—Al alloy doped with a small amount of Cd/cadmium, Hg/Mercury, In/indium. The following plating may be particularly listed.

Zn series plating: (Zn—Al alloy plating (dopant is In, Cd, Hg), Zn—Fe alloy plating, Zn—Al alloy plating, Zn—Cr alloy plating, Zn—Al—Mg alloy plating, Zn—Al—Mg—Si alloy plating Al series plating: (Al: 50 mass percent or more): Al plating, Al—Zn Alloy plating: (dopant is In, Sn)

Although the kind of the photocatalyst used as the main body of the photocatalyst particles is not particularly limited, it may be listed n-type semiconductor materials such as gallium phosphide (GaP), zirconium oxide ($ZrO_2$), silicon (Si), cadmium sulfide (CdS), potassium tantalate ($KTaO_3$), cadmium selenide (CdSe), strontium titanate ($SrTiO_3$), titanium oxide ($TiO_2$ anatase-type, rutile-type, brookite-type), niobium oxide ($Nb_2O_5$), zinc oxide (ZnO), iron oxide ($Fe_2O_3$), tungsten oxide ($WO_3$), tin oxide ($SnO_2$) or the like and the material doped with antimony (Sb) or nitrogen (N).

The semiconductor material supported on the photocatalyst is not limited and the followings are listed.

Indium oxide ($In_2O_3$), ITO (tin/Sn-doped indium oxide: In2O3), FTO (fluorine/F-doped tin oxide/$SnO_2$), ATO (antimony/Sb-doped tin oxide/$SnO_2$), AZO (aluminum/Al doped-zinc oxide/ZnO), GZO (gallium/Ga-doped zinc oxide/ZnO), IZO (indium/In-doped zinc oxide/ZnO). The volume resistivity of the semiconductor material may preferably be $1\times10^{-1}$~$1\times10^2$ $\Omega\cdot$cm.

As the reason for using the photocatalyst supporting a semiconductor material, a common photocatalyst generates active oxygen species having strong oxidizing ability on the surface of the photocatalyst upon the irradiation of ultraviolet light and the active oxygen species may consume electrons excited from the photocatalyst. Further, the strong oxidizing ability may be a cause of the corrosion of the underlying metal material and the sacrificial anode metal.

In the case that the photocatalyst supporting a semiconductor material is used, the generation of the active oxygen species on the surface of the photocatalyst is prevented. Alternatively, the thus generated active oxygen species hardly contact the sacrificial anode metal or the underlying metal material, therefore prevent the corrosion due to the active oxygen species. Further, the electrons excited by the photocatalyst are directly injected into the sacrificial anode metal or the underlying metal material through the semiconductor material, so that the metal material can be stabilized.

The volume resistivity of the photocatalyst supporting the semiconductor material may preferably be $1\times10^{-2}$ to $1\times10^4$ $\Omega\cdot$cm. The crystalline structure includes various shapes such as a sphere or needle. A needle-shaped conductive titanium oxide (referred to as photocatalyst "RATO" below) is particularly preferred, for improving the corrosion prevention performance of the steel with the photocatalyst.

The photocatalyst supporting a semiconductor material is preferably chemically stable materials which are not susceptible the crystallinity, volume resistivity, shape or the like by the temperature, electrolytes, reducing agent, additive or the like of a plating solution.

The shape of supporting of the semiconductor material is not particularly limited and includes the followings.

(1) The particles of the semiconductor material is adhered onto and supported by the surface of the photocatalyst particle.

(2) A coating of the semiconductor material is formed on the surface of the photocatalyst particle.

Figure 2:
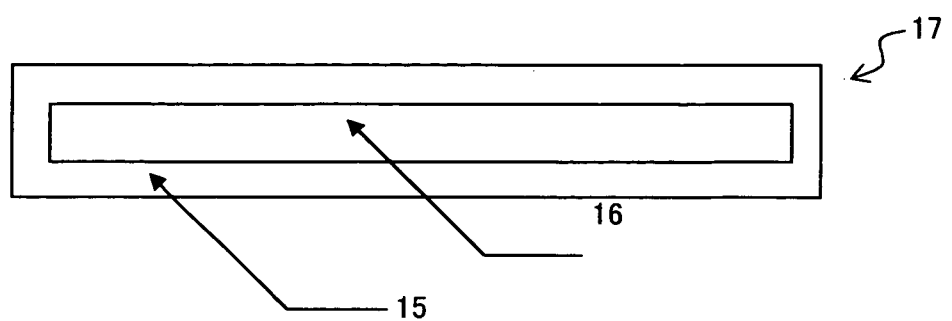

FIG. 2 is a diagram schematically showing the photocatalyst particle supporting the semiconductor material on the surface. The photocatalyst particle 17 may preferably be "RATO" (Product of ISHIHARA SANGYO KAISHA, LTD. (FT-3000)), in which a particulate main body 16 of rutile type titanium oxide is surrounded with a coating 15 of tin oxide doped with antimony (referred to as "RATO" below). The weight ratio of the rutile-type titanium oxide in the photocatalyst "RATO" is about 92 percent. Further, the shape is needle-shaped crystal having a diameter of 0.27 µm and a length of about 5.15 µm.

It is known the characteristic reducing ability of the photocatalyst "RATO", that is, to generate excited photo-electrons capable of shifting the immersion potential of, for example, stainless steel to non-noble potential of minus 300 to minus 400 mV (vs. Ag/AgCl).

The weight ratio of each component in the composite plating film of the present invention is not limited, and is preferably the followings.

With respect to 100 weight parts of a total weight of the photocatalyst having the sacrificial anode metal and semiconductor material formed thereon, Sacrificial anode metal: 85.0 to 99.9 weight parts Photocatalyst supporting semiconductor material: 0.1 to 15.0 weight parts The composite plating film may be formed by electroplating (electrolytic plating), chemical plating (electroless plating), hot-dipping, diffusion coating (cementation) or the like.

Specifically, the following methods are preferred.

(A) The photocatalyst particles, having the main bodies of the photocatalyst and, semiconductor material supported on the main body, are added to a hot-dipping bath. The metal material is immersed in the bath to form the composite plating film, on the metal material, having the plating film of the sacrificial anode metal and the photocatalyst particles dispersed and fixed in the plating film.

(B) The photocatalyst particles, having the main bodies of the photocatalyst and semiconductor material supported on the main body, are contained in aqueous solution of the salt of the sacrificial anode metal. The metal material is immersed in the aqueous solution and a current is applied in the aqueous solution to form the composite plating film, on the metal material, having the plating film of the sacrificial anode metal and the photocatalyst particles dispersed and fixed in the plating film.

(C) The photocatalyst particles, having the main bodies of the photocatalyst and semiconductor material supported on the main body, are contained in aqueous solution of the salt of the sacrificial anode metal. The metal material is immersed in the aqueous solution and the salt of the sacrificial anode metal is reduced with a reducing agent to form the composite plating film, on the metal material, having the plating film of the sacrificial anode metal and the photocatalyst particles dispersed and fixed in the plating film.

For example, in a zinc plating solution, as an additive for alkaline plating solution, quaternized amine polymer and quaternized imidazole derivative may be added to zincate series zinc plating solution (method of obtaining frosted plating: Japanese patent publication S63-9594B), or an aromatic aldehyde (Japanese patent publication S56-2156B) or hydroxy allyl compound (Japanese patent publication H3-63542B) may be added as a brightener. Further, as non-cyanidation solution, it may be listed non-cyanidation solution (Japanese patent publication S60-15715B) to which zinc chloride plating solution polyoxyalkylation naphthol or tetrahydro naphthalene sulfonic acid is added, non cyanidation plating solution (Japanese patent publication No. S61-41998B) excellent in brightening effect containing additives such as polyoxyethylene, alkylether or the like and either of zinc chloride and zinc sulfamate, and brightening zinc plating solution (Japanese patent publication No. S57-47276B) obtained by adding a brightener such as methane sulfonic acid or butyl nicotinate to non-cyanidation solutions.

As to brightening agent, isoquinoline diethyl sulfate or polyglycidol may be added to alkanol sulfonic acid or alkane sulfonic acid as a brightner (Japanese patent publication No. S57-27944B). Particularly as a brightening agent not limiting the kind of the zinc plating solution, it may be added an aromatic sulfonic acid, an aromatic carbonyl compound, polyalkylimine (Japanese patent publication No. S61-32399B), polyoxyalkylene alkyl thiol or polyoxyalkylene dithiol (Japanese patent publication No. S62-23077B), a polyamide polymer and thiourea (Japanese patent publication No. S58-26435B) and further polyoxyalkylene naphthol and polyethylene imine (Japanese patent publication No. S58-19755B).

As an additive excellent in ductility and brightness, it is listed a condensation polymer of an epihydrin compound and a heterocycle of 5 to 6 membered ring containing at least two nitrogen atoms (Japanese patent publication No. H60-25514B), and a polyhydric alcohol such as benzylideneacetone, glycerin, sorbitol, mannitol or the like (Japanese patent publication No. S58-41357B). Further, it may be used acidic zinc plating solution (Japanese patent publication No. S63-9026B) excellent in uniform electrodeposition with an aromatic dicarboxylic acid, an aromatic aldehyde, phenylthiourea or the like added, acidic zinc plating solution (Japanese patent publication No. 60-45713B) excellent in ductility and brightness with β-aminopropionic acid and a derivative of aminopropionic acid added, and brightness-giving and acidic zinc plating solution (Japanese patent publication No. H01-28839B) with ethoxylated α-naphthol sulfate or ethoxylated α-naphthol.

As high-speed zinc plating, many additives may be added. It may be listed zinc plating solution (Japanese patent publication No. S63-9592B and S63-9593B) capable of high current density plating with aminocarboxylic acid or polyether series non-ionic surfactant added, proposal of a polyamide brightener (Japanese patent publication No. S63-62595B), a high-speed brightness-giving zinc plating solution (Japanese patent publication No. 1-36559B) with polyacrylamide added, polyhydroxy compound as a brightener (Japanese patent publication No. H5-49759B), zinc sulfate plating solution (Japanese patent publication No. H3-10717B) with a brightener such as amino acid including eglycine, hydroxyl proline or proline added, brightness-giving zinc plating solution (Japanese patent publication No. H3-19311B, H3-19312B) of solution of zinc sulfate with aminocarboxylic acid added, anionic and sulfated polyoxyalkylene surfactant (Japanese patent publication No. H1-41717B and H3-46553B), hydroxyl styrene series polymer (Japanese patent publication No. H3-19319B), and polyoxyalkylene and an organic quaternary ammonium halide (Japanese patent publication No. S56-28997B).

As to tin plating, it may be used tin plating solution (Japanese patent publication No. S60-2396B) of tin sulfate or tin-phenolsulfonic acid solution with a specific amount of alkali ion, Al, Mn and Cr ion added. That is excellent in waterproof and adhesion property with an organic adhesive.

And it may be used tin plating solution (Japanese patent publication No. 59-37755B) of tin-sulfamate solution with hydroxycarboxylic acid (such as tartaric acid, lactic acid or malic acid).

As tin plating method termed as "Whisker" for preventing the generation of needle-shaped crystal, phosphoric ester of hydroxyethane may be added to plating solution containing a main component of stannous chloride or stannous sulfate whose pH is neutralised with sodium hydroxide or phosphoric acid (Japanese patent publication No. 59-15993B).

As the method of improving the brightness of tin plating, the degradation of brightness can be prevented by adding 1 to 5 percent of Sb ions to tin or tin solder plating solution (Japanese patent publication No. S59-41514B). Alternatively, ethoxyl naphthol or the derivative can be added to common acidic tin plating solution for improving the brightness after reflow process in the tin plating of copper or copper alloy (Japanese patent publication No. H 2-53519B).

Stannous ion ($Sn^{2+}$) is oxidized to stannic ion ($Sn^{4+}$) to provide a hydroxide, which is precipitated. As a countermeasure, it may be applied a method of using dihydroxynaphthalene or hydroxyquinoline as an oxidation inhibitor of tin plating solution (Japanese patent No. 2572792B), a method of adding the sulfonate of dihydroxy aromatic compound (Japanese patent No. 2667323B). Further, it may be used a method of adding hydroxyl ammonium salt to electrolytic coloring solution for aluminum containing a main component of stannous sulfate to prevent the oxidation of tin, to stabilize the tin plating solution and to maintain the coloring function of the electrolyte over a long period of time (Japanese patent publication No. H6-96793B).

As an additive of tin plating solution having a low load of waste water treatment, alkane sulfonic acid and alkanol sulfonic acid may be used instead of phenolsulfonic acid. For improving the brightness of tin plating solution containing alkanol sulfonic acid, alkane sulfonic acid and stannous ion, a non-ionic surfactant may be added (Japanese patent publication H2-17912B). A surfactant having a specific structure (for example, lauryl trimethyl ammonium salt) is added to tin plating solution containing alkanol sulfonic acid, alkane sulfonic acid and stannous ion (Japanese patent publication No. H3-4631B), a specific alkyl phenol, alkyl-β-naphthol may be added to a high-speed plating solution (Japanese patent publication No. 62-14639B), the alkali metal salt of an aliphatic acid or aromatic sulfocarboxylic acid is added to plating solution (Japanese patent publication No. H1-16318B), ethyleneoxide•naphthol is added to bath (Japanese patent publication No. H3-43356B), or an alkylene oxide compound is added to alkanol sulfonic acid (Japanese patent publication No. 7-30478B).

As to the other tin plating solution, it may be used brightness-giving tin plating solution containing stannous pyrophosphate as a main component with a polyphenol and a surfactant added (Japanese patent publication No. S58-18996B), plating solution excellent in corrosion resistance with alkanolamine added (Japanese patent publication No. S62-19519B), plating solution containing stannous salt (for example, stannate chloride), gluconic acid and a surfactant (Japanese patent publication No. 59-10997B), and tin plating solution (Japanese patent publication No. S58-15553B) with a cyclic reaction product of an aromatic aldehyde and epihalohydrin as a brightner.

As tin plating solution aiming at acceleration of tin plating, it may be used high-speed plating solution containing stannous chloride and hydrochloric acid as main components with alkyl pyridinium and a unsaturated carbonyl compound added (Japanese patent publication No. H1-20240B) and high-speed tin plating solution containing stannous sulfate and sulfuric acid as main components and formalin or the like with nicotinic acid added (Japanese patent publication No. H1-60556B).

Figure 3:
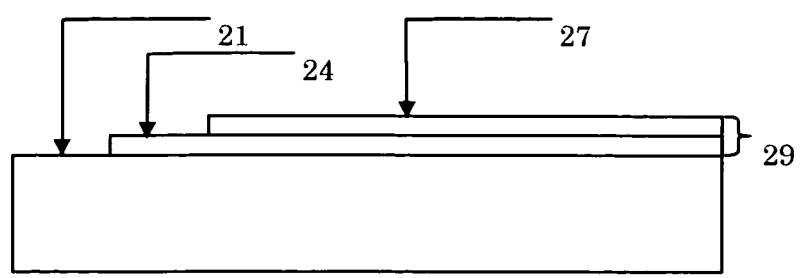
Figure 3:
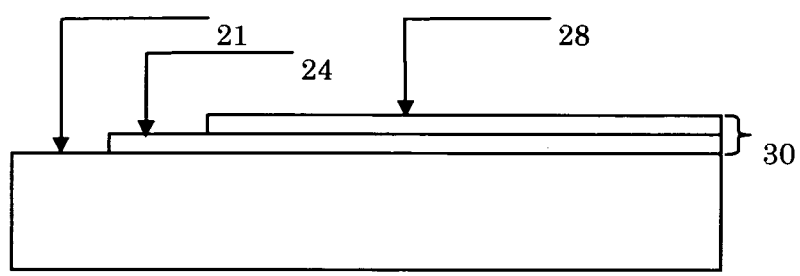
Figure 3:
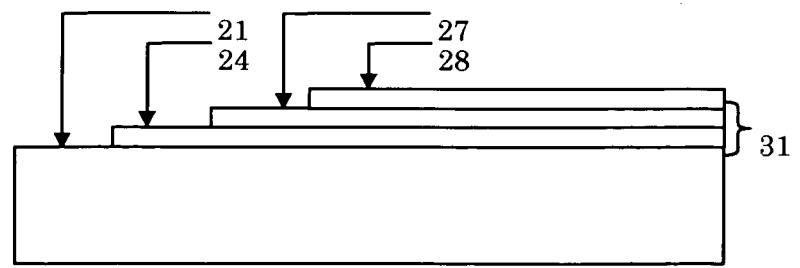

According to a preferred embodiment, as shown in FIG. 3 (a), a upper film 27 is formed by chromate treatment on the surface of the composite plating film 24 according to the present invention to obtain a laminated film 29. It is thus possible to improve the appearance of the film and to further reduce the elution of the sacrificial anode metal 23 in the composite plating film 24 and the corrosion of steel. Such upper film 27 includes coloured chromate, bright chromate (unichrome), black chromate, green chromate and trivalent chromate.

Further, as shown in FIG. 3 (b), a corrosion prevention resin coating 28 (dried coating) may be formed on the surface of the composite plating film 24 according to the present invention to further reduce the elution of the sacrificial anode metal 23 in the composite plating film 24 and the corrosion of steel.

Further, as shown in FIG. 3 (c), the chromate film 27 and the corrosion prevention coating 28 may be laminated in this order on the composite plating film 24 to form a laminated film 31.

Light shielding or light transmitting of inorganic or organic paint may be applied directly, or through the chromate film or corrosion prevention resin coating, on the composite plating film 24. These are dried and cured to form a corrosion prevention film 28 suppressing the elution of the sacrificial anode metal 23 in the composite plating film 24 and the corrosion of steel.

The paints include the followings.

(1) Oil paint; (oil paint, oil enamel)

(2) Nitrocellulose lacquer (lacquer enamel, high solid lacquer, hot lacquer, special lacquer, under coat)

(3) Synthetic resin paint (phthalic resin paint, aminoalkyd resin paint, epoxy resin paint, vinyl resin paint, polyurethane resin paint, unsaturated polyester resin paint, acrylic resin paint, chlorinated rubber paint, water paint (water soluble resin paint), silicone resin paint, fluoro resin paint)

(4) Paints for specific applications (1. anticorrosive paint: anticorrosive paint for general use, red-lead anticorrosive paint, lead suboxide anticorrosive paint, basic lead chromate anticorrosive paint, lead cyanamide anticorrosive paint, zinc dust anticorrosive paint, photocatalyst-containing zinc dust anticorrosive paint, zinc chromate anticorrosive paint, red-lead zinc chromate anticorrosive paint, calcium plumbate anticorrosive paint:

2. Ship bottom paint:

3. Another other paints: mold (mildew) resistant paint, heat resistant paint, fire-retardant paint, heat reflection paint, thermo paint, fluorescent paint, chemical resistant paint, electrical insulating paint, light (solar) reflecting paint, luminescent paint, strippable paint, traffic paint, sound proof paint, photocatalyst paint (coating))

(5) Special performance paint (solvent-free paint, electrodeposition paint, vinyl (chloroethylene)-sol paint, non-aqueous dispersion paint)

(6) Special appearance paint (metallic paint, multi-design paint, sand wall spraying material, laminated design spraying material, mastic paint)

(7) Undercoats (primer, putty, surfacer, primer surfacer, etching primer)

The applications of the composite plating film 24 according to the present invention and the steel with the composite plating film are not particularly limited and include the followings.

(1) Metal materials of structures such as pylons, bridges or the like and machineries such as automobiles, ships, railways and machines.

(2) Metal materials for tower (vessel), heat exchangers, heating furnaces, turbine, measuring devices, electrical equipments or the like in chemical plants or the like and for piping for connecting the devices and facilities.

The material with the composite plating film according to the present invention can be effectively used under the dark as well as the irradiation of light.

According to the first and second aspects of the present invention, the "dark" condition means the application of the corrosion prevention film under the circumstances where light is not substantially irradiated. Specifically, it means the condition that the quantity of solar radiation in one day averaged per year is 0.5 $MJ/m^2$ or lower (the north side of a building, the inner side or underside of a structure or the like) where sun light is not directly irradiated, as well as the inside of steel structures (inside of a tank or steel pipe or the like) where light is not irradiated.

The second aspect of the present invention will be described below.

Figure 4:
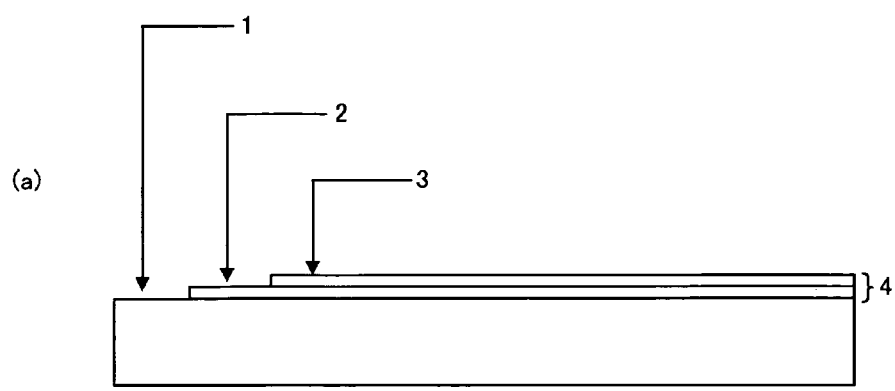
Figure 4:
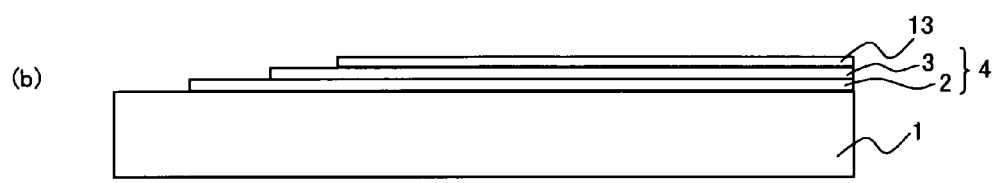

FIG. 4 (a) is a diagram schematically showing a composite film 4 according to the present invention formed on a metal material 1. The corrosion prevention coating 2 of the invention and an upper film 3 are formed in the order on the metal material 1. Further, as shown in FIG. 4 (b), a surface film 13 may be formed on the composite film 4. The surface film 13 may be divided into two or more layers.

The method of forming the corrosion prevention film 2 is not particularly limited, and the following method is preferred.

(1) A corrosion prevention film formed by applying corrosion prevention paint containing a sacrificial anode metal and fine particles of a semiconductor oxide.

(2) A corrosion prevention plating film formed from plating solution containing fine particles of a semiconductor oxide and at least one of a sacrificial anode metal and a compound of a sacrificial anode metal.

The corrosion prevention coating will be described below.

In the case that rust is generated on the coated surface of a metal material 1, the rust is removed by sand-blasting, descaling or the like depending on the degree of rust. A paint containing the semiconductor oxide fine particles and the sacrificial anode metal is applied on the metal material 1 by a roller coating, brushing or spraying to form a corrosion prevention coating 2. Preferably, after the paint is dried, an inorganic paint resulting in a dried and porous coating is applied with a roller coating, brushing or spraying to form an upper film 3.

The corrosion prevention paint of the invention is a paint containing the sacrificial anode metal and the semiconductor fine particles. The binder used in the paint is not limited, and may preferably be an inorganic binder in the case that heat resistance is important. Further, in the case of aiming at the corrosion prevention of common steels, it may be used an organic binder, an inorganic binder or an organic-inorganic hybrid binder. In the case that an organic binder is applied, sandblasting for obtaining anchor effect of the corrosion prevention coating 2 can be made unnecessary. On the viewpoint, an organic binder is preferred.

Although the kind of the binder is not particularly limited, the following is listed as preferred examples.

(Inorganic Binder)

The inorganic binder includes a product to obtain by the heat treatment of a water-soluble silicate, modified water-soluble silicate or colloidal silica.

The water-soluble silicate is represented by a general formula $M_2O \cdot xSiO_2 \cdot yH_2O$, where "M" represents an alkali metal such as sodium, lithium, potassium or the like and "x" and "y" represent an integer. Specific compounds includes one or two or more of silicates of alkali metals such as sodium silicate, potassium silicate, lithium silicate or the like. Further, boron or a phosphoric compound may be added for improving the stability and water proof property of the corrosion prevention film 2 using a binder of the water-soluble silicate.

The modified water soluble silicate includes those obtained by modifying the above water soluble silicate with one or two or more of the oxide, hydroxide, fluoride or silicofluoride of a metal selected from aluminum, magnesium, calcium, barium, strontium, zinc, zirconium and vanadium, and those obtained by modifying the water soluble silicate with sodium silicofluoride, potassium zincate trisilicofluoride, fluoro-aluminum complex salt, fluoro-zinc complex salt or the like (Japanese patent publication No. S52-18636A).

In the case that colloidal silica, the heat treated product of a metal oxide sol, is utilized, the other applicable metal oxide sols include the oxides of metals such as silicon, aluminum, iron, titanium, zirconium, magnesium, niobium, tantalum, tungsten, tin, zinc and cerium. The metal oxide may be used alone, or mixed sol of a plurality of the metal oxides may be used. Sol of a composite oxide comprising plural metals may be also used. The dispersant for the sol of the metal oxide is not limited, and water is preferred.

The dispersant for the inorganic binder (water soluble silicate, modified water soluble silicate, colloidal silica) may be mixed solvent of water soluble alcohol and water. The components include an alcohol having 1 to 3 carbon atoms (methanol, ethanol, modified alcohol, 1-propanol, 2-propanol). The alcohol may be used alone or a plurality of alcohols may be mixed and used. Further, the other component includes propylene glycol monoalkyl ether (the alkyl group has 1 to 3 carbon atoms). Since it has a higher boiling point than that of an alcohol, it is possible to improve the leveling and to adjust the rate of evaporation. Further, it is possible to obtain the corrosion prevention film 2 without deteriorating the wettability of the film onto the metal material 1, by making the number of carbon atoms to 1 to 3 in alkyl.

Further, these inorganic binders (water soluble silicate, modified water soluble silicate, colloidal silica) may contain the other water soluble solvent. The other water soluble solvent includes glycol ethers such as ethylene glycol monomethyl ether, diethylene glycol monoethyl ether; glycols such as ethylene glycol, propylene glycol; ketones such as acetone or dimethyl ketone; ethers such as tetrahydrofuran, dioxane or the like; esters such as propylene glycol monomethyl ether·acetate or the like; acetonitrile, N-methyl pyrrolidone, dimethyl sulfoxide or the like.

Such inorganic binder may optionally contain a surfactant, a thickener, a fragrance, an antioxidant, an absorbing agent of ultraviolet light, a light stabilizer, a chelate, an antifoaming agent or the like.

(Organic Binder)

It may be listed epoxy resin, epoxy ester resin, styrene resin and alkyd resin.

(Organic-Inorganic Hybrid Binder)

An organic-inorganic hybrid binder means a resin containing an organic component and an inorganic component.

The organic-inorganic hybrid binder includes the water soluble silicate, alkyl silicate, alkoxy-silicate, a coupling agent or the like.

The water soluble silicate is represented by a general formula $M_2O \cdot xSiO_2 \cdot yH_2O$, as described above, where "x" and "y" represent an integer and "M" represents $N(C_2H_4OH)_2$, $N(CH_2OH)_4$, $N(C_2H_4OH)_4$ and $C(NH_2)_3NH$. Specific compounds include triethanol amine silicate, tetramethanol ammonium silicate, tetraethanol ammonium silicate or the like.

Further, an emulsion component of a weather-resistant resin may be contained in the inorganic binder for improving the weather resistance of the inorganic binder (water soluble silicate, modified water soluble silicate, colloidal silica). The emulsion of the weather-resistant resin is not particularly limited as far as is strongly adheres to a base having an organic material on the surface and has weather resistance. Specific examples include acryl emulsion, acrylic silicone emulsion (silicone acrylic emulsion), fluoride resin emulsion or the like.

In addition to this, an organic compound having a boiling point of 100° C. or higher and being liquid at ordinary temperature may be contained, so that the emulsion state is converted to amorphous macromolecule state at ordinary temperature in the formation of a coating to improve the adherence of the coating.

The organic compound having a boiling point of 100° C. or higher and being liquid at ordinary temperature remains in the coating after a substantial portion of water is evaporated, to facilitate the fusion of the emulsion. It includes ethylene glycol ethers such as ethylene glycol monomethyl ether, ethylene glycol monoethyl ether, ethylene glycol monobutyl ether, diethylene glycol monopropyl ether, diethylene glycol monobutyl ether, diethylene glycol monohexyl ether, ethylene glycol ethyl ether acetate, diethylene glycol monobutyl ether acetate or the like; propylene glycol ethers such as propylene glycol monomethyl ether, propylene glycol monobutyl ether, propylene glycol monopropyl ether, propylene glycol monobutyl ether, dipropylene glycol monomethyl ether, dipropylene glycol dimethyl ether, dipropylene glycol monobutyl ether, tripropylene glycol monomethyl ether, tripropylene glycol monobutyl ether, polypropylene glycol monomethyl ether, propylene glycol monomethyl ether acetate, propylene glycol diacetate, propylene glycol phenyl ether or the like; and esters such as 2,2,4-trimethyl-1,3-pentanediol monoisobutyrate, n-pentyl propionate, dibutyl phthalate or the like. 2,2,4-trimethyl-1,3-pentanediol monoisobutyrate, one of the esters, has excellent permeability to emulsion and effect of reducing the minimum film-forming temperature, and thus preferred.

The alkyl silicate is represented by a general formula of $SiR_4$ or $SiXR_3$, where $R_3$ and $R_4$ represent alkyl group and X represents alkoxy, vinyl, epoxy, amino, methacryl or mercapto group. The alkyl group includes straight chain or branched chain alkyl group having 1 to 5 carbon atoms such as methyl group, ethyl group, propyl group, butyl group or the like, and specific compounds include tetramethyl silicate, tetraethyl silicate, tetrapropyl silicate, tetrabutyl silicate or the like.

The alkoxyl silane is represented by a general formula of $Si(OR)_4$ or $SiX(OR)_3$, $SiR(OR)_3$, where R represents alkyl group and X represents vinyl group, epoxy group, amino group, methacryl group or mercapto group. The alkyl group includes straight chain or branched chain alkyl group having 1 to 5 carbon atoms such as methyl group, ethyl group, propyl group, butyl group or the like. Specific compounds include tetramethoxy silane, tetraethoxy silane, tetrapropoxy silane, tetrabutoxy silane or the like.

The coupling agent includes silane series coupling agents such as γ-glycydoxy propyl trimethoxy silane, γ-glycydoxy propyl methyl diethoxy silane, β-(3,4-epoxy cyclohexyl) ethyl trimethoxy silane, vinyl triethoxy silane, γ-methacryloxy trimethoxy silane, γ-mercapto propyl trimethoxy silane or the like; titanium series coupling agent such as isopropyl triisostearoyl titanate, tetraoctyl bis(didodecyl)phosphite titanate, isopropyl trioctanoyl titanate, isopropyl tridodecyl benzene sulfonyl titanate or the like; aluminum series coupling agent, zirconium series coupling agent or the like.

The weight ratio for the components in the dried corrosion prevention film of the invention is not particularly limited, and the followings are preferred.

With respect to 100 weight parts of a total weight of the sacrificial anode metal and binder, Sacrificial anode metal: 50 to 90 weight parts (more preferably be 60 to 90 weight parts)

Binder: 10 to 50 weight parts (more preferably be 10 to 40 weight parts)

Semiconductor oxide fine particles (3.5 to 15 weight parts (more preferably 5.3 to 8.9 weight parts)

Semiconductor oxide fine particles: 2 to 15 weight parts (more preferably 3 to 8 weight parts: with respect to 100 weight parts of the whole weight of the paint Further, the amount (whole amount including solvent) of application of the inventive paint onto a metal surface to be applied is not limited, and may be 100 to 750 g and more preferably be 150 to 450 g with respect to 1 m$^2$ of the metal surface to be applied.

(2) The corrosion prevention film can be formed from the following plating solution according to a common plating process.

The semiconductor oxide fine particles described later (preferably photocatalyst particles) may be contained in plating solution containing the following sacrificial anode metal or the compound of the sacrificial anode metal and an additive.

The composite plating film thus produced has a plating film made of the sacrificial anode metal formed on the metal material and photocatalyst fine particles dispersed and fixed in the plating film. The photocatalyst particles include particulate main bodies and semiconductor material supported with the main bodies.

FIG. 1 is a diagram schematically showing a composite plating film formed on a metal material 21. The composite plating film 24 is composed of a plating layer 23 made of the sacrificial anode metal and photocatalyst fine particles 22 are dispersed and are fixed in the plating layer.

The metal material is subjected to pretreatment for plating to remove oils and fats and rust on the surface. The method of the pretreatment for plating includes alkali cleaning, pickling, electrolytic cleaning, washing with water, washing with hot water, flux treatment or the like, according to normal procedures of the pretreatment for plating.

The weight ratio of each component in the composite plating film of the present invention is not limited, and is preferably the followings.

With respect to 100 weight parts of a total weight of the sacrificial anode metal and the photocatalyst particles supporting the semiconductor material, Sacrificial anode metal: 85.0 to 99.9 weight parts Photocatalyst supporting semiconductor material: 0.1 to 15.0 weight parts The composite plating film may be formed by electroplating (electrolytic plating), chemical plating (electroless plating), hot-dipping, diffusion coating (cementation) or the like.

Although the kind of the sacrificial anode metal for plating is not particularly limited, it may be listed one metal or the alloy of Zn/zinc, Mg/magnesium and Al/aluminum; Mg—Al—Zn alloy, Al—Zn alloy doped with a small amount of In/indium or Sn/tin; Zn—Al alloy doped with a small amount of Cd/cadmium, Hg/Mercury, In/indium. The following plating may be particularly listed.

Zn series plating (Zn—Al alloy plating (dopant is In, Cd, Hg), Zn—Fe alloy plating, Zn—Al alloy plating, Zn—Cr alloy plating, Zn—Al—Mg alloy plating, Zn—Al—Mg—Si alloy plating Al series plating (Al: 50 mass percent or more), Al plating, Al—Zn alloy plating: (dopant is In, Sn)

Specifically, each of the methods of manufacturing (A), (B) and (C) is preferred. Further, all the descriptions of the first aspect of the invention are referred to and included herein concerning "zinc plating solution", "brightner", "additives excellent in both properties of ductility and brightness", "high speed zinc plating", "tin plating", "method of improving brightness of tin plating", "additives for tin plating solution requiring low load of waste water processing" or the like.

According to a preferred embodiment, as shown in FIG. 3 (a), a upper film 27 is formed by chromate process on the surface of the composite plating film 24 to obtain a laminated film 29. It is thus possible to improve the appearance of the film and to further reduce the elution of the sacrificial anode metal 23 in the composite plating film 24 and the corrosion of steel. Such upper film 27 includes coloured chromate, bright chromate (unichrome), black chromate, green chromate and trivalent chromate.

Further, as shown in FIG. 3 (b), a corrosion prevention resin coating 28 (dried coating) may be formed on the surface of the composite plating film 24 to further reduce the elution of the sacrificial anode metal 23 in the composite plating film 24 and the corrosion of steel.

Further, as shown in FIG. 3 (c), the chromate film 27 and the corrosion prevention resin coating 28 may be laminated in this order on the composite plating film 24 to form a laminated film 31.

Light shielding or light transmitting of inorganic or organic paint may be applied directly, or through the chromate film or corrosion prevention resin coating, on the composite plating film 24. These are dried and cured to form a corrosion prevention film 28 suppressing the elution of the sacrificial anode metal 23 in the composite plating film 24 and the corrosion of steel. The light shielding paints described later are listed as such paints.

The semiconductor oxide fine particles are not particularly limited as far as they are particles of oxides having semiconductor property. The semiconductor means a material having a volume resistivity of $10^{-6}$ to $10^7$ Ω·cm. Further, although the average particle size of the particles is not particularly limited, it may preferably be 10 μm or smaller and more preferably be 5 μm or smaller.

Although the kind of the semiconductor oxide fine particles is not particularly limited, it may be listed n-type semiconductor materials such as gallium phosphide (GaP), zirconium oxide ($ZrO_2$), silicon (Si), cadmium sulfide (CdS), potassium tantalate ($KTaO_3$), cadmium selenide (CdSe), strontium titanate ($SrTiO_3$), titanium oxide ($TiO_2$ anatase-type, rutile-type, brookite-type), niobium oxide ($Nb_2O_5$), zinc oxide (ZnO), iron oxide ($Fe_2O_3$), tungsten oxide ($WO_3$), tin oxide ($SnO_2$) or the like and the n-type semiconductor material doped with antimony (Sb) or nitrogen (N).

The crystalline structure of the semiconductor oxide fine particles is not particularly limited, and includes various shapes such as a sphere or needle. A needle-shape is particularly preferred, for improving the corrosion prevention performance.

On the semiconductor oxide fine particles, another semiconductor material having a relatively lower volume resistivity may preferably be supported. The supported semiconductor material includes the followings.

Indium oxide ($In_2O_3$), ITO (tin/Sn-doped indium oxide: In2O3), FTO (fluorine/F-doped tin oxide/$SnO_2$), ATO (antimony/Sb-doped tin oxide/$SnO_2$), AZO (aluminum/Al doped-zinc oxide/ZnO), GZO (gallium/Ga-doped zinc oxide/ZnO), IZO (indium/In-doped zinc oxide/ZnO). The volume resistivity of the semiconductor material may preferably be $1\times10^{-2}\sim1\times10^2$ Ω·cm.

As the reason for supporting the semiconductor material, common semiconductor particles, particularly photocatalyst particles, generate active oxygen species having strong oxidizing ability on the surface upon the irradiation of ultraviolet light and the active oxygen species may consume electrons excited from the photocatalyst. Further, the strong oxidizing ability may be a cause of the corrosion of the underlying metal material and the sacrificial anode metal.

In the case that the semiconductor material is supported, the generation of the active oxygen species on the surface of the photocatalyst is prevented. Alternatively, the thus generated active oxygen species hardly contact the sacrificial anode metal or the underlying metal material, therefore prevent the corrosion due to the active oxygen species. Further, the electrons excited by the photocatalyst are directly injected into the sacrificial anode metal or the underlying metal material through the semiconductor material, so that the metal material can be stabilized.

The volume resistivity of the semiconductor oxide particles supporting the semiconductor material may preferably be $1\times10^{-2}$ to $1\times10^{-4}$ Ω·cm.

The shape of supporting the semiconductor material is not particularly limited, and the followings are listed.

(1) Particles of the semiconductor material is adhered onto the surface of the semiconductor oxide particles and thus supported.

(2) A coating of the semiconductor material is formed on the surface of the semiconductor oxide fine particles.

As such particles, needle-shaped conductive titanium oxide "referred to as "RATO" below" is most preferred. "RATO" in a product of ISHIHARA SANGYO KAISHA, LTD. (FT-3000), in which a particulate main body 16 of rutile type titanium oxide is surrounded with a coating 15 of tin oxide doped with antimony (referred to as "ATO" below). The weight ratio of the rutile-type titanium oxide in the "RATO" is about 92 percent. Further, the shape is needle-shaped crystal having a diameter of 0.27 μm and a length of 5.15 μm.

The characteristics of "RATO" is as follows. That is, the oxidizing ability (decomposing effect of an organic material) of the rutile type titanium oxide is low under the irradiation of ultraviolet light, and the titanium oxide is covered with ATO and does not directly contact the binder even if the binder is an organic compound to prevent the decomposition of the organic binder. On the other hand, as to the reducing force, it is known the characteristic reducing ability of "RATO", that is, to generate excited photoelectrons capable of shifting the immersion potential of, for example, stainless steel to non-noble potential of minus 300 to minus 400 mV (vs. Ag/AgCl).

Although the kind of the sacrificial anode metal is not particularly limited, it may be listed one metal or the alloy of Zn/zinc, Mg/magnesium and Al/aluminum; Mg—Al—Zn alloy, Al—Zn alloy doped with a small amount of In/indium or Sn/tin; Zn—Al alloy doped with a small amount of Cd/cadmium, Hg/mercury, In/indium.

The inorganic material of the upper film 3 providing porous and dried coating is not limited, and aqueous silicate paint and the above described colloidal silica are listed.

The inorganic material of the upper film 3 providing porous and dried coating is formed on the corrosion prevention film of the invention so that the elution of the sacrificial anode metal in the corrosion prevention film can be prevented.

The amount of application of the top coat (total amount including solvent) may preferably be 150 to 300 g and more preferably be 150 to 200 g with respect to 1 $m^2$ of the metal surface to be applied.

Alternatively, light shielding or light transmitting inorganic or organic paint may be applied directly, or through the inorganic porous film, on the corrosion prevention film. The light-shielding paints include the followings.

(1) Oil paint; (oil paint, oil enamel)

(2) Nitrocellulose lacquer (lacquer enamel, high solid lacquer, hot lacquer, special lacquer, under coat)

(3) Synthetic resin paint (phthalic resin paint, aminoalkyd resin paint, epoxy resin paint, vinyl resin paint, polyurethane resin paint, unsaturated polyester resin paint, acrylic resin paint, chlorinated rubber paint, water paint (water soluble resin paint), silicone resin paint, fluoro resin paint)

(4) Paints for specific applications (1. anticorrosive paint: anticorrosive paint for general use, red-lead anticorrosive paint, lead suboxide anticorrosive paint, basic lead chromate anticorrosive paint, lead cyanamide anticorrosive paint, zinc dust anticorrosive paint, zinc chromate anticorrosive paint, red-lead zinc chromate anticorrosive paint, calcium plumbate anticorrosive paint:

2. Ship bottom paint:

3. Another other paints: mold (mildew) resistant paint, heat resistant paint, fire-retardant paint, heat reflection paint, thermo paint, fluorescent paint, chemical resistant paint, electrical insulating paint, light (solar) reflecting paint, luminescent paint, strippable paint, traffic paint, sound proof paint)

(5) Special performance paint (solvent-free paint, electrodeposition paint, vinyl (chloroethylene)-sol paint, non-aqueous dispersion paint)

(6) Special appearance paint (metallic paint, multi-design paint, sand wall spraying material, laminated design spraying material, mastic paint)

(7) Undercoats (primer, putty, surfacer, primer surfacer, etching primer)

The metal material 1 is not limited, and it is particularly useful for the following metals.

Pure iron, electrolytic iron, carbon steel, limmed steel, killed steel, semi-killed steel, alloy steel, superalloy, capped steel, anti-corrosion steel, hot-dip aluminium coated steel, chromium-plated steel, hot-dip galvanized coated steel, electrolytic zinc-coated steel, aluminum-zinc alloy coated steel, lead-tin alloy coated steel (terne coated steel), tinplate steel, silicon steel, chromium plated tin free steel.

The applications of the present invention are not particularly limited and the followings are listed.

(1) Surface painting of tower (vessel), heat exchangers, heating furnaces, turbine, measuring devices, electrical equipments or the like, paints for pipings for connecting the devices and facilities in in-door facilities such as chemical plants, or surface painting of the above equipments concentrated in out-door facilities where the amount of irradiation per one day is 0.5 MJ/$m^2$ as an average over a year.

(2) Surfaces of underground structures. For example, surface coatings on the inner and outer surfaces of pipings embedded in underground, or surface coatings of inner reinforcing steels in concrete structures.

(3) Coatings on back slab of reinforced concrete bridges or the back face of steel bridges for landing, which is used for receiving crops, heavy oil, coal, LNG, LPG or the like and where the amount of irradiation per one day is 0.5 MJ/cm² or lower as an average of a year.

(4) Similarly, coatings on the back faces of bridges (steel bridges, concrete bridges, composite bridges) and elevated railroad bridges, where the amount of irradiation per one day is 0.5 MJ/cm² or lower as an average of a year.

(5) Surface of structures in the sea. For example, surface coatings for supporting pillars of facilities in the sea, the inner and outer surfaces of pipings and steel plank on the seacoast, or the like.

EXAMPLES

Although the first aspect of the present invention will be described further in detail below, the present invention is not limited to the examples.

Example A1

Zinc sulfate aqueous solution (ZnSO₄) of a concentration of 1 mol/l was prepared, and 1 mg of the semiconductor material powder "RATO" was added to 100 ml of the solution, agitated and dispersed to prepare plating solution. This is moved to a plating bath and maintained at a temperature of 20° C. while agitating. A steel plate having a length of 10 mm, width of 10 mm and thickness of 0.1 mm was degreasing, washed with water, dried at the surface and immersed in the plating bath. Electrolytic plating Electroplating was performed while a constant current process of 10 mA/cm² was applied for 30 minutes, and the plate washed with water and dried to obtain a test sample of example 1. The thus obtained test sample had Zn plating layer in which the semiconductor material powder "RATO" was eutectoid.

Comparative Example A1

A plating film was formed on the steel plate according to the same procedure as the example A1. However, the plating bath was made of the zinc sulfate aqueous solution having a concentration of 1 mol/l with RATO not added.

Comparative Example A2

A plating film was formed on the steel according to the same procedure as the example A1. However, the plating bath was made of the zinc sulfate aqueous solution having a concentration of 1 mol/l. RATO was not added, and instead, 1 mg of a photocatalyst TiO₂ powder was added to the plating bath, which was agitated to disperse the powder. The plating bath was used to prepare a test sample according to the same procedure as the example A1. The photocatalyst TiO₂ was eutectoid in the Zn plating layer in the thus obtained test sample.

(Test of Elution of Zinc)

3 percent sodium chloride (NaCl) aqueous solution was prepared as test liquid. Each of the obtained test samples was immersed in the test liquid for 24 hours in the dark. Further, 100 mW/cm² of ultraviolet light was irradiated for 8 hours to the test liquid and then held for 16 hours in the dark with the test sample immersed therein.

1 mol/l of hydrochloric acid (HCl) was added to the test liquid after the immersion to obtain liquid for evaluation. The amount of elution of zinc into the liquid for evaluation was measured by atomic absorption method. The results were shown in table 1.

TABLE 1

| Category | Test sample | | Immersion in the dark Amount of elution of zinc (μmol/L) | Immersion under the irradiation of ultraviolet light and in the dark |
|---|---|---|---|---|
| Example | A1 | A | 29.1 | 17.8 |
| Comparative example | A1 | A | 39.9 | 44.7 |
| | | B | 58.2 | |
| | | C | 53.6 | |
| | A2 | A | 36.0 | 44.8 |
| | | B | 44.9 | |
| | | C | 43.9 | |

As can be seen from the results of measurement of amount of elution of zinc, the amount of elution of zinc from the composite zinc plating (invention-example A1) containing the photocatalyst particles with the semiconductor materials formed thereon was lower than about a half of that of the composite zinc plating (comparative example A2) containing common titanium oxide photocatalyst particles with no semiconductor material formed thereon. By providing the photocatalyst "RATO", it was confirmed that photoelectrons excited from the photocatalyst upon irradiation of ultraviolet light are injected directly, or through the semiconductor material, into the sacrificial anode metal or the underlying metal material, so that the elution of zinc was suppressed. The above described mechanism of corrosion prevention of steel was thus proved.

Although the second aspect of the present invention will be described further in detail below, the present invention is not limited to the examples.

Example 1

5 percent of "RATO" was added to organic zinc-rich paint ("Zettar EP-2HB" supplied by DAI NIPPON TORYO CO., LTD.) having a matrix of epoxy resin, which was then applied onto a flat plate steel (70×150×1.6 mm) pre-treated with sand blasting, by a brush to form the corrosion prevention film 2 (440 g/m²). Aqueous silicate paint ("SSA-1000" supplied by NIPPAN KENKYUJO CO., LTD.) was applied on the corrosion prevention film 2 to form the upper film 3 (150 g/m²).

A fluoro resin paint ("V flon #200 finish clear coat: supplied by DAI NIPPON TORYO CO., LTD.) was applied on the upper film 3 to form a surface film 13 (100 g/m²), which was then cured at 23° C. for 7 days. After the curing, two scratches intersecting diagonally with each other were provided in the film in the lower half of the sample according to JIS K5600-7-1-6.5 (method of forming scratches).

Comparative Example 1

The organic zinc-rich paint ("Zettar EP-2HB" supplied by DAI NIPPON TORYO CO., LTD.) having a matrix of epoxy resin was applied onto a flat plate steel (70×150×1.6 mm) pre-treated with sand blasting, by a brush to form the corrosion prevention film 2 (440 g/m²). Aqueous silicate paint ("SSA-1000" supplied by NIPPAN KENKYUJO CO., LTD.) was applied on the corrosion prevention film 2 to form the upper film 3 (150 g/m²). A fluoro resin paint ("V flon #200 finish clear coat: supplied by DAI NIPPON TORYO CO., LTD.) was applied on the upper film 3 to form a surface film 13 (100 g/m²), which was then cured at 23° C. for 7 days.

After the curing, two scratches intersecting diagonally with each other were provided in the film in the lower half of the sample according to JIS K5600-7-1-6.5 (method of forming scratches).

Example 2

5 percent of "RATO" was added to organic zinc-rich paint ("Zettar EP-2HB" supplied by DAI NIPPON TORYO CO., LTD.) having a matrix of epoxy resin, which was then applied onto a flat plate steel (70×150×1.6 mm) pre-treated with sand blasting, by a brush to form the corrosion prevention film 2 (440 g/m$^2$). Aqueous silicate paint ("SSA-1000" supplied by NIPPAN KENKYUJO CO., LTD.) was applied on the corrosion prevention film 2 to form the upper film 3 (150 g/m$^2$).

A epoxy resin paint ("V top H intermediate coat: supplied by DAI NIPPON TORYO CO., LTD.) was applied on the upper film 3 to form a film (120 g/m$^2$). Then, on the surface of the film, polyurethane resin paint ("V top H finish coat: supplied by DAI NIPPON TORYO CO., LTD.) was applied on the film to form (120 g/m$^2$) the surface film 13, which was then cured at 23° C. for 7 days. After the curing, two scratches intersecting diagonally with each other were provided in the film in the lower half of the sample according to JIS K5600-7-1-6.5 (method of forming scratches).

Comparative Example 2

The organic zinc-rich paint ("Zettar EP-2HB" supplied by DAI NIPPON TORYO CO., LTD.) having a matrix of epoxy resin was applied onto a flat plate steel (70×150×1.6 mm) pre-treated with sand blasting, by a brush to form the corrosion prevention film 2 (440 g/m$^2$). Aqueous silicate paint ("SSA-1000" supplied by NIPPAN KENKYUJO CO., LTD) was applied on the corrosion prevention film 2 to form the upper film 3 (150 g/m$^2$).

A epoxy resin paint ("V top H intermediate coat: supplied by DAI NIPPON TORYO CO., LTD.) was applied on the upper film 3 to form a film (120 g/m$^2$). Then, on the surface of the film, polyurethane resin paint ("V top H finish coat: supplied by DAI NIPPON TORYO CO., LTD.) was applied on the film to form (120 g/m$^2$) the surface film 13, which was then cured at 23° C. for 7 days. After the curing, two scratches intersecting diagonally with each other were provided in the film in the lower half of the sample according to JIS K5600-7-1-6.5 (method of forming scratches).

The above four samples were evaluated according to JIS K5621-7.12 (conditions of combined cyclic of combined cyclic corrosion test machine) by a combined cyclic corrosion test machine ("CYP-90UV: Suga testing machine Co., Ltd.). Specifically, a test of spraying salt water was performed at 30±2° C. (0.5 hours), a humidity test was performed at 30±2° C. (humidity of 95±3 percent) (1.5 hours), a hot-wind drying test was performed at 50±2° C. (2.0 hours, under the irradiation of ultraviolet light: 1 mW/cm$^2$), and a warm-wind drying test was performed at 30±2° C. (2.0 hours, under the irradiation of ultraviolet light: 1 mW/cm$^2$). The cycle was repeated 600 times.

Figure 6:
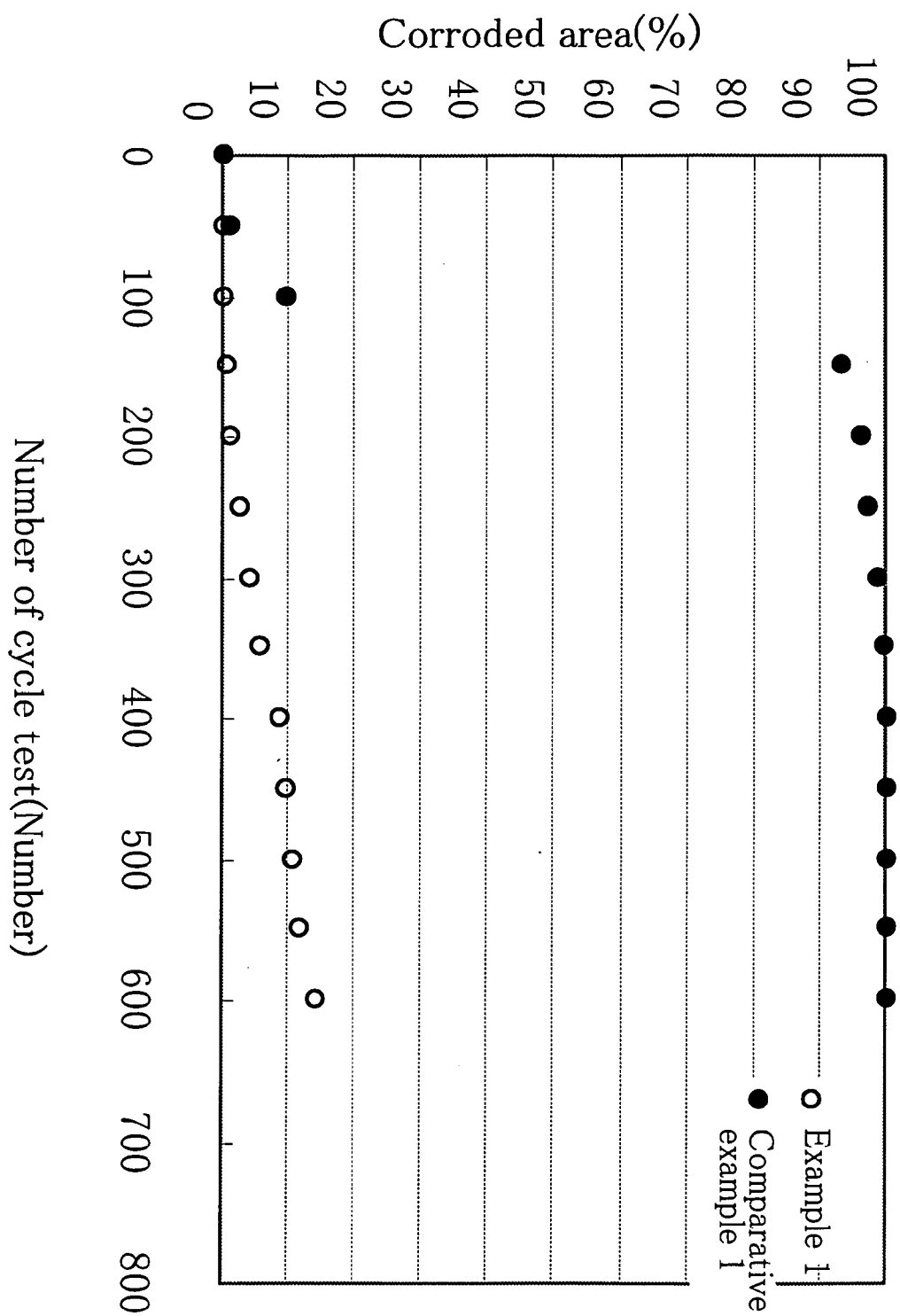
FIG. 6 is a graph showing the results of evaluating the degree of corrosion of the surfaces of samples of inventive example 1 and comparative example 1 by a combined cyclic corrosion test.

The surface corrosion of the samples according to the inventive and comparative examples 1 were evaluated according to the combined cyclic corrosion test. It was obtained the results shown in FIG. 6. The corrosion prevention effect was thus proved.

Figure 7:
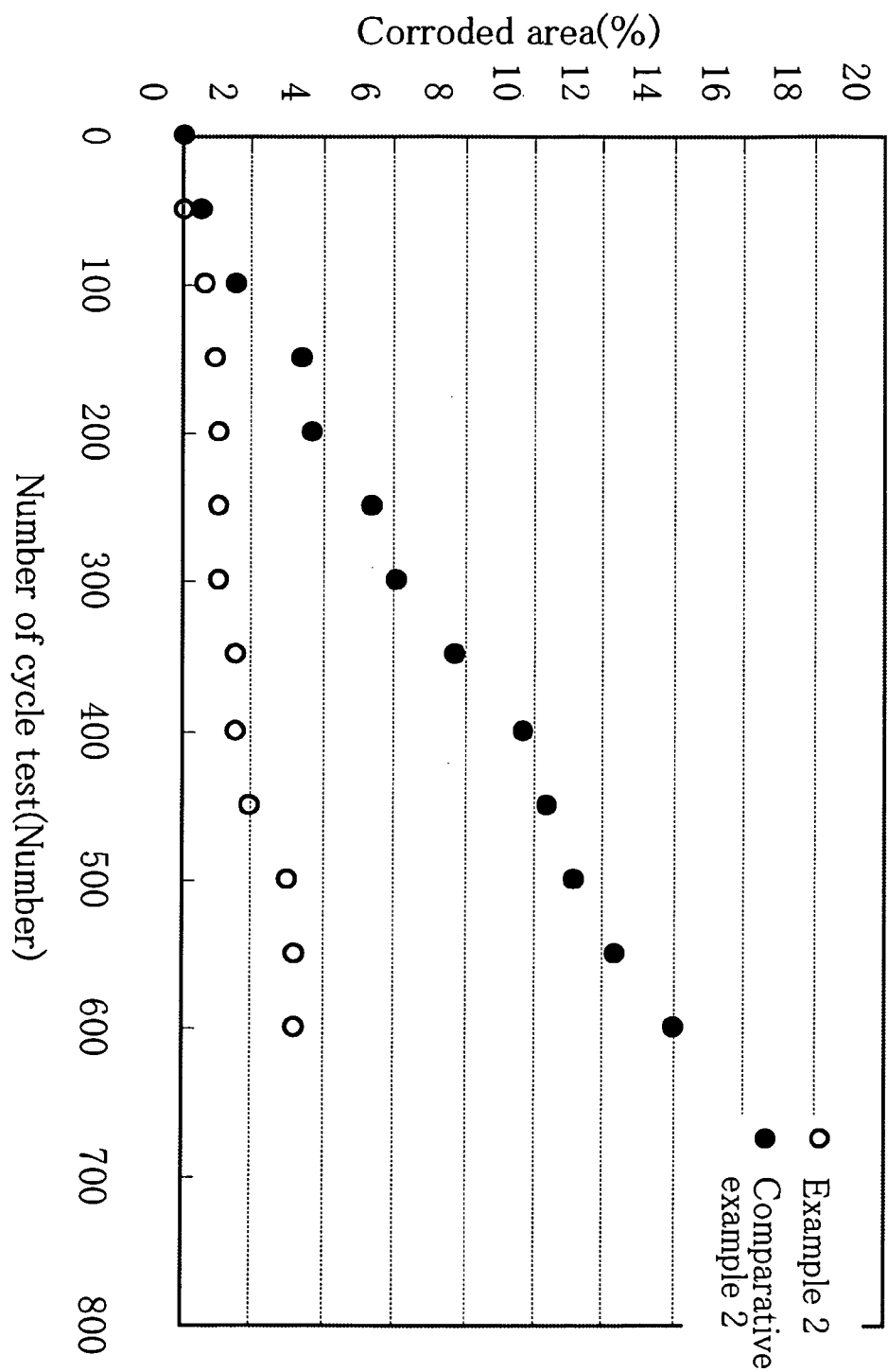
FIG. 7 is a graph showing the results of evaluating the degree of corrosion of the surfaces of samples of inventive example 2 and comparative example 2.

Further, the surface corrosion of the samples according to the inventive and comparative examples 2 were evaluated to obtain the results shown in FIG. 7. The corrosion prevention effect can be recognized.

Example 3

Experiment of Measuring Potential 5 percent of "RATO" was added to the organic zinc-rich paint having a matrix of epoxy resin to obtain a paint, which was applied on a steel bar (ϕ 10×110 mm) to form a rust prevention layer by a brushing, so that the covering ratio (a ratio of painted area/total surface area of immersed test sample) was made 50 percent in the case that the steel was immersed in a sample solution 7 of 3 wt. % NaCl in a beaker 6. The sample was cured for 7 days at 23° C. to obtain a test sample 5 according to the present invention.

Figure 5:
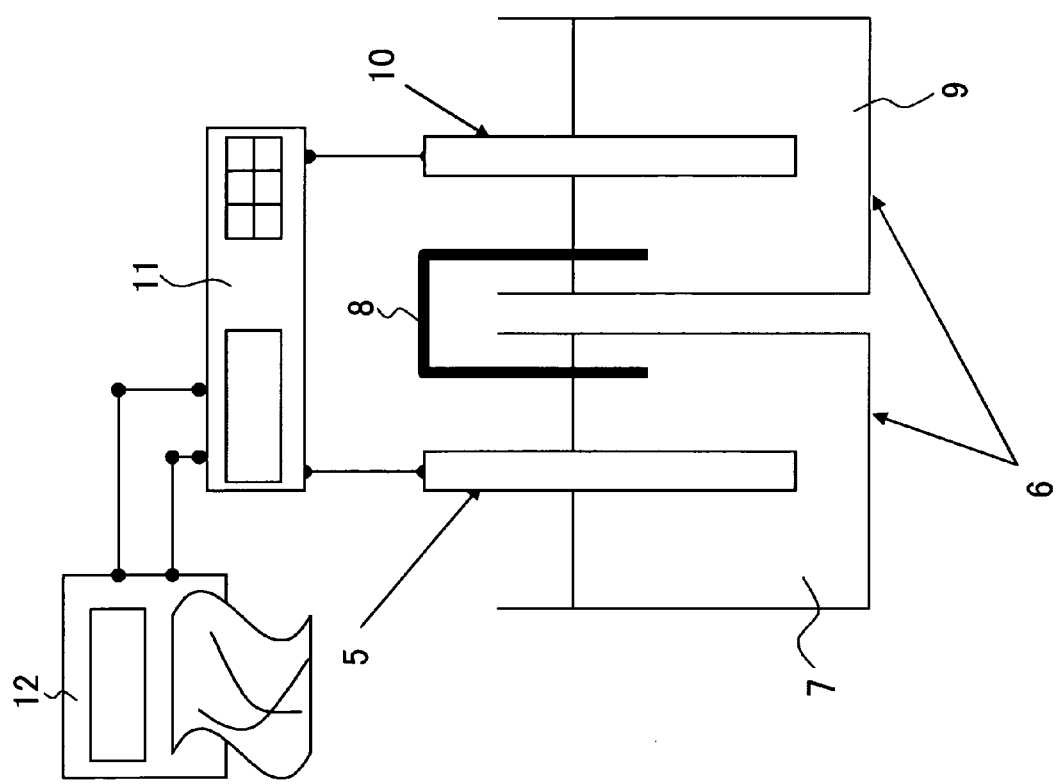
FIG. 5 is a diagram schematically showing a system of measuring the rust prevention effect.
Figure 8:
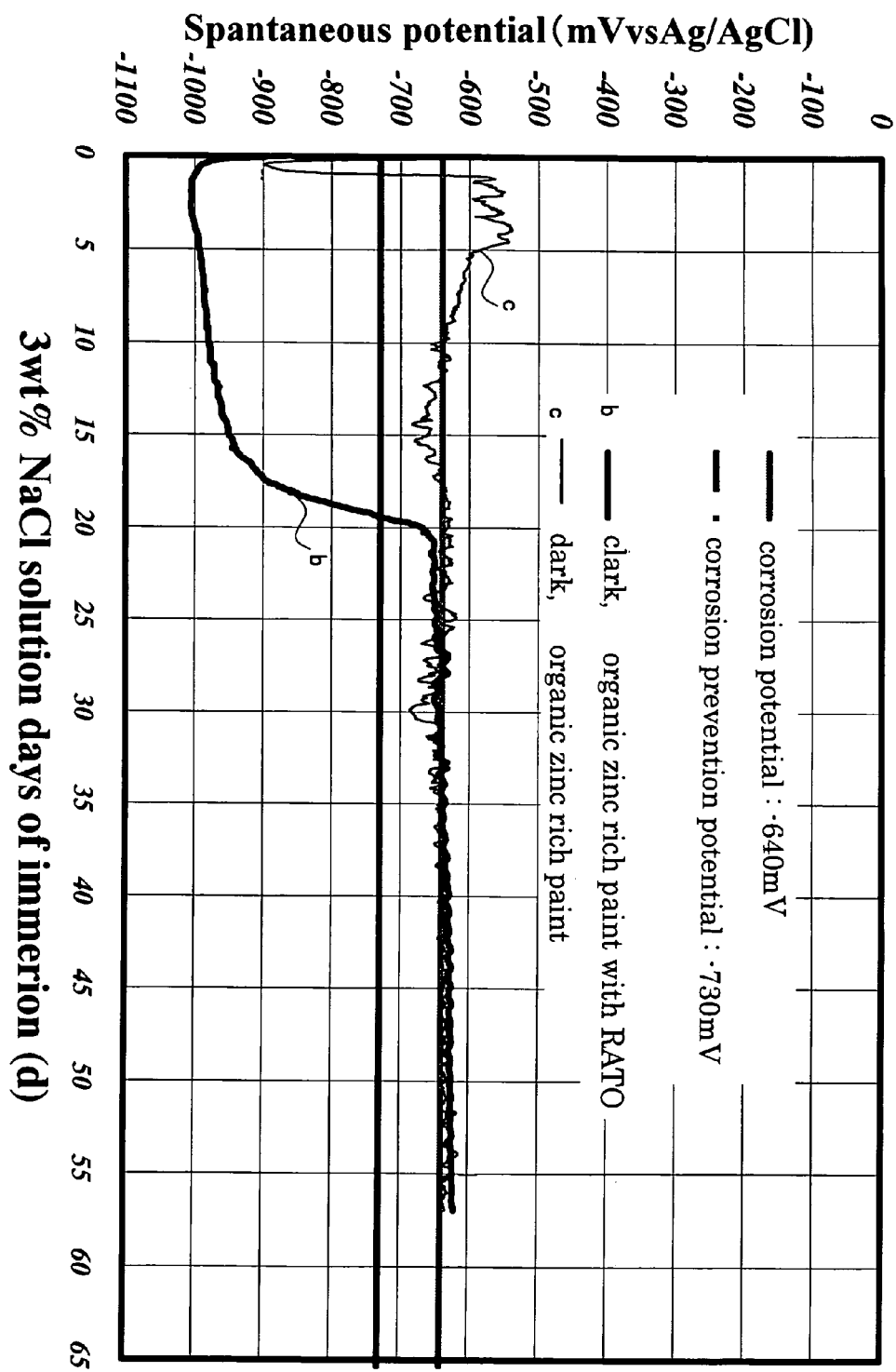
FIG. 8 is a graph showing the change of potential in each of the inventive examples and comparative examples.

FIG. 8 shows the results of measurement of natural potential. As to the measurement of that natural potential, as shown in FIG. 5, an electrical circuit was constituted with a salt bridge 8, a silver/silver chloride electrode 10 (Ag/AgCl, omitted below) was made a reference electrode in saturated potassium chloride solution 9, the measurement was performed through as potentiostat 11, and the results were recorded on a chart of a recorder 12. The evaluation of the rust prevention ability was performed by comparing the time required for entering into so-called corrosion range exceeding the corrosion prevention potential (minus 730 mV) in the course of the natural potential is moved to the corrosion potential (minus 640 mV) of iron.

Further, for confirming the effectiveness of "RATO", a comparison test was performed with the test sample 5 using the organic zinc-rich paint which does not contain "RATO".

The potential of the test sample according to the present invention was measured in the dark to obtain the results (graph b) of FIG. 8.

Further, the potential of the test sample according to the comparative example was measured in the dark to obtain the results (graph c) of FIG. 8.

In the case of the organic zinc-rich paint (comparative example), the spontaneous potential rapidly rises and exceeds the corrosion potential in the dark state (graph c).

In the case of the inventive example (graph b), the needle-shaped conductive titanium oxide was used ("RATO" according to the present example), it is considered that corrosion prevention effect based on the photo-electrochemical cathodic protection function should be absent. However, it was proved that the potential was lower than the corrosion potential over a considerable time to obtain the corrosion prevention effect, although the reasons are not clear.

Example 4

The test same as the example 3 was performed. However, the metal material was made a carbon steel with chrome plating, instead of the carbon steel. As a result, the similar results were obtained in the inventive example

The invention claimed is:
1. A composite plating film comprising a zinc film and photocatalyst particles dispersed and fixed in the zinc film, the zinc film comprising an electrolytic or a hot-dipping plating,
wherein the photocatalyst particles comprise a particulate main body comprising a titanium oxide and a semiconductor material supported with the particulate main body,
the semiconductor material comprises tin oxide doped with antimony, and
the elution of zinc from the composite plating film, evaluated after exposing the composite plating film to 100 mW/cm$^2$ of ultraviolet light for eight hours followed by maintaining, after the exposing, the composite plating film in the dark for 16 hours, is suppressed, when compared to a same composite plating film that does not comprise titanium oxide particles with a semiconductors material supported thereon.

2. A laminated film comprising the composite plating film of claim 1, and a chromate film formed on said composite plating film.

3. A laminated film comprising the composite plating film of claim 1, and a corrosion prevention resin coating formed on said composite plating film.

4. A laminated film comprising the composite plating film of claim 1, and a chromate film and a corrosion prevention resin coating formed on said composite plating film.

5. The composite plating film of claim 1, wherein zinc is contained in the film an amount of 85.0 to 99.9 weight parts and the photocatalyst particles are contained in an amount of 0.1 to 15.0 weight parts provided that a total amount of zinc and the photocatalyst particles is 100 weight parts.

6. A composite plating film comprising a metal plating consisting of zinc and photocatalyst particles dispersed and fixed in the metal plating,
wherein the photocatalyst particles comprise a particulate main body comprising titanium oxide and a semiconductor material supported with the particulate main body,
the semiconductor material comprises tin oxide doped with antimony, and
the elution of zinc from the composite plating film, evaluated after exposing the composite plating film to 100 mW/cm$^2$ of ultraviolet light for eight hours followed by maintaining, after the exposing, the composite plating film in the dark for 16 hours, is suppressed, when compared to a same composite plating film that does not comprise titanium oxide particles with a semiconductor material supported thereon.

7. A laminated film comprising the composite plating film of claim 6, and a chromate film formed on the composite plating film.

8. A laminated film comprising the composite plating film of claim 6, and a corrosion prevention resin coating formed on the composite plating film.

9. A laminated film comprising the composite plating film of claim 6, and a chromate film and a corrosion prevention resin coating formed on the composite plating film.

10. The composite plating film of claim 6, wherein zinc is contained in the film in an amount of 85.0 to 99.9 weight parts and the photocatalyst particles are contained in an amount of 0.1 to 15.0 weight parts provided that a total amount of zinc and the photocatalyst particles is 100 weight parts.

* * * * *